Patented Oct. 13, 1931

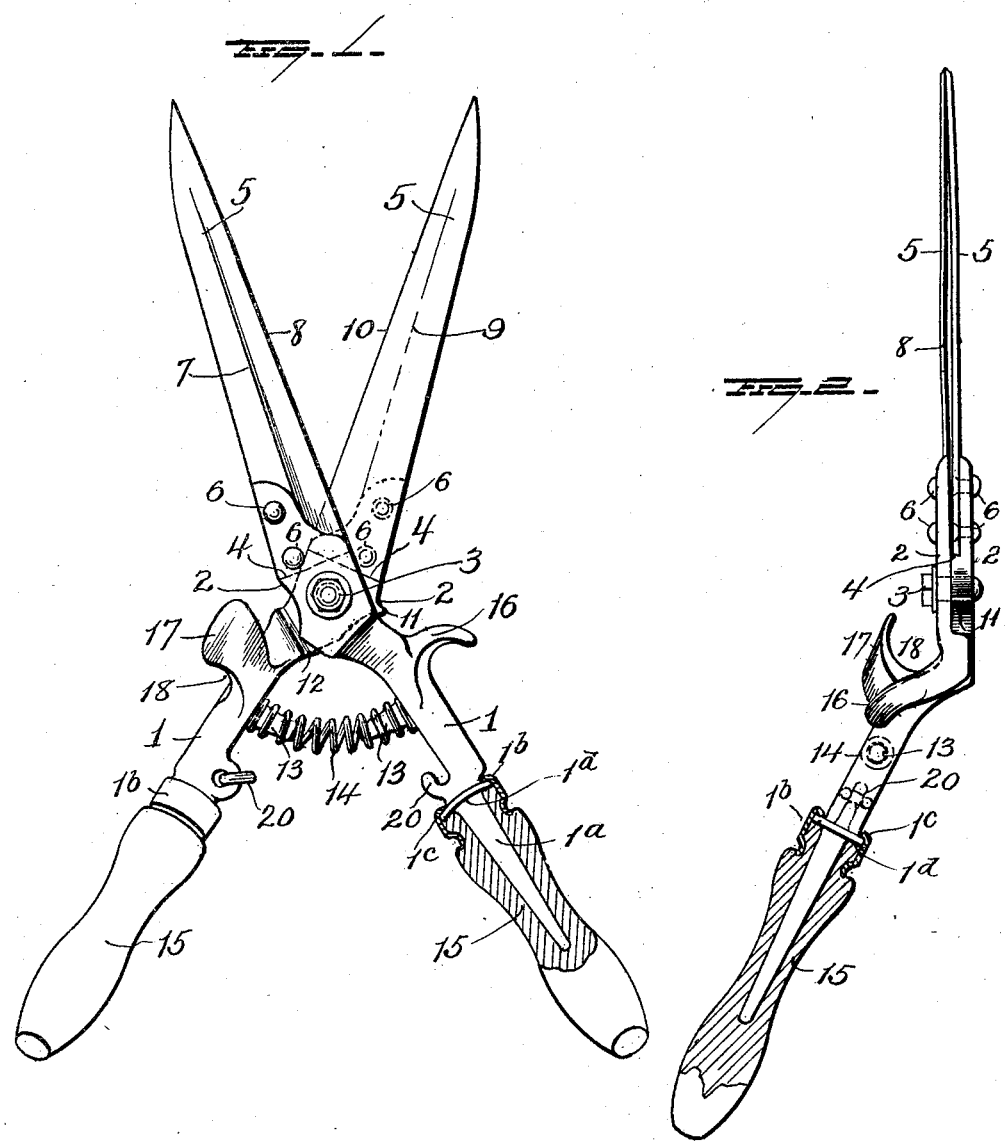

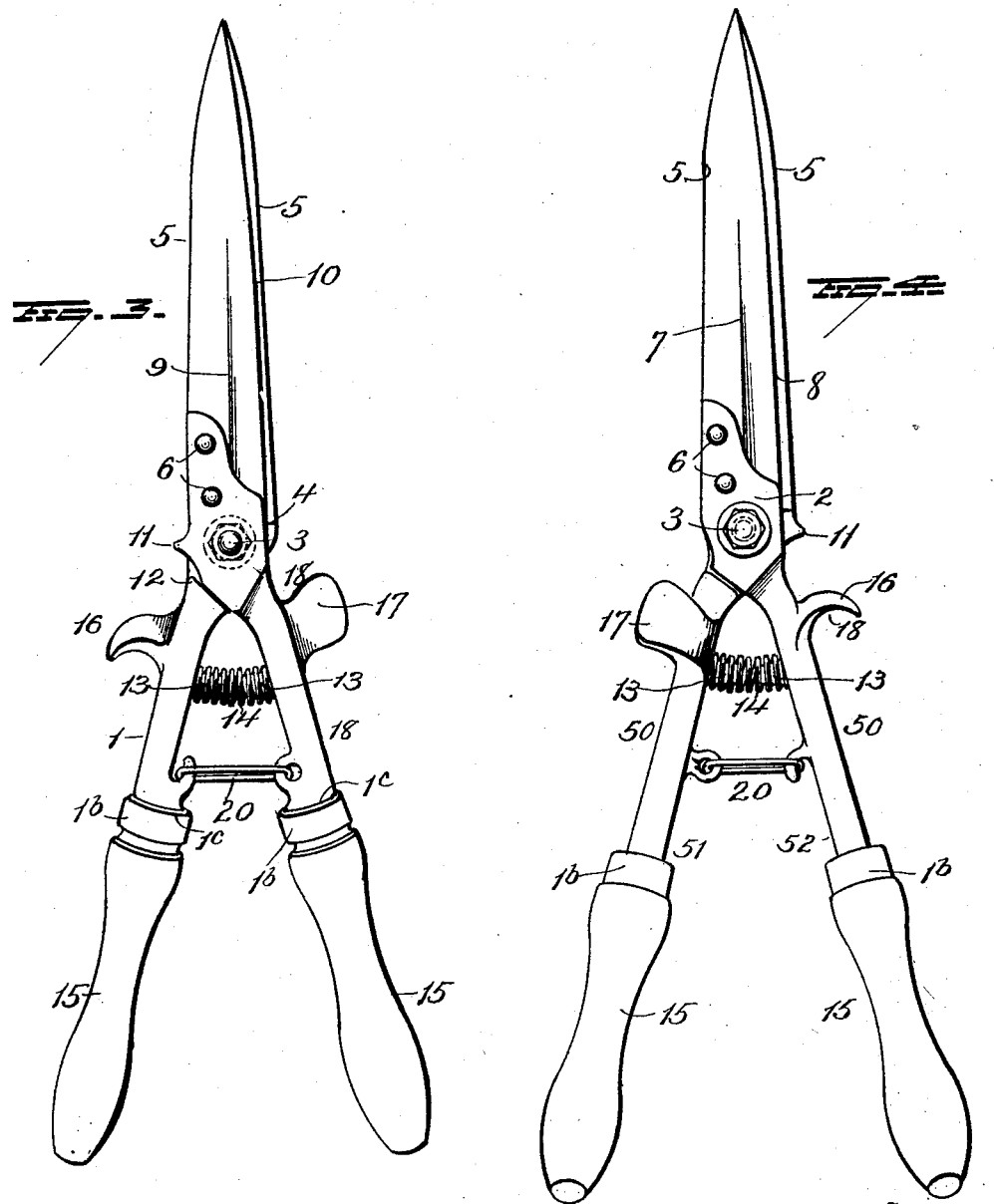

1,827,149

UNITED STATES PATENT OFFICE

WILLIAM G. HEIMERDINGER, OF LOUISVILLE, KENTUCKY

COMBINED HEDGE CLIPPER AND GRASS CUTTER

Application filed March 13, 1929. Serial No. 346,713.

This invention relates to a combined hedge clipper and grass cutter, and more especially to a dual purpose cutter of the shear type.

The primary object of the invention is to furnish a shear having relatively long handles for use when the implement is employed to clip a hedge or the like, and also provided with auxiliary handle members to allow the device to be operated by one hand when the implement is to be employed for trimming grass.

Another object is to provide a shear of this type in which the grip members of the long handles are offset, so that their outer side surfaces of the grip members substantially align with the handle shanks, which makes the device easier to handle for one-hand operation.

A further object is to furnish a shear with long handles to be operated by both hands, and provided with auxiliary members to permit the implement to be actuated by one hand.

A still further object is to provide improved means for securing the wooden grip members to the handle shanks.

With the foregoing objects outlined and with other objects in view which will appear as the description proceeds, my invention consists in the novel features hereinafter described in detail, illustrated in the accompanying drawings, and more particularly pointed out in the appended claim.

Referring to the drawings,

Fig. 1 is a top plan view of the improved shear with the cutters opened.

Fig. 2 is a side elevation with the cutters closed.

Fig. 3 is a bottom plan view with the cutters closed.

Fig. 4 is a top plan view of a simplified modification.

In the drawings, 1 designates a pair of handle shanks, each provided at one end with a finger extension 2 arranged at an angle to the main portion of the handle. These finger portions are crossed, and pivotally connected together by a fulcrum pin 3. Adjacent surfaces of the fingers are recessed as shown at 4, to receive the butt ends of the shear blades 5, and each blade is connected to the corresponding finger by rivets 6 or the like. The upper blade has its upper surface inclined downwardly as at 7, towards its cutting edge 8, and the lower blade is upwardly beveled at 9, towards its cutting edge 10. Consequently, when the handle shanks are rocked back and forth, the blades may readily cut grass, light shrubbery or the like.

From Fig. 3 it may be seen that the upper finger has a depending lug 11 designed to cooperate with a laterally projecting lug 12 on the lower finger for limiting the opening movement of the cutter blades. Closing movement is limited by abutments 13, projecting toward one another from intermediate portions of the handle shanks, and cooperating with a coiled spring 14 which assists in opening the cutters.

Ordinary grip members 15 of wood or the like are mounted on the outer ends of the shanks, and the operator grasps these members when the shear is used for clipping light shrubbery or the like.

In order that the implement may also be employed for trimming lawns in a manner similar to the conventional hand operated grass shear, one of the handle shanks is provided with an outwardly extending hook-element 16, and the other has an upwardly and outwardly extending hook-element 17, the inner surface 18 of which extends lengthwise of the shank in order that the implement may be comfortably operated by one hand. When the device is to be actuated by the right hand, for instance, the user places his palm on the rounded portion 18, which is located between the hook 16 and the grip member of that handle shank, and the inner surface of the hook 16 is brought to bear against the side of the first finger of the hand. The thumb of that hand is then brought to bear against the inner surface of the upwardly and outwardly extending hook element 17, and then the device can be used in the same manner as an ordinary lawn trimming shear.

In order that the outer surfaces of the grip members 15 may align with the outer surfaces of the intermediate portions of the shanks, the outer end portions of the shanks are offset inwardly, as shown at 1ª. This feature makes it much easier for operation by one hand.

Each grip member 15 is preferably connected to its shank by means of a clinching ferrule $1^b$ that is crimped over at $1^c$ upon a disk $1^d$ forming part of the shank.

At 20, a conventional fastening means is shown for holding the handles in closed position when the device is not in use.

Heretofore, it has always been deemed necessary to provide two implements for the purposes of cutting grass, and trimming hedges, and the present invention enables the elimination of one of such implements, and provides a simple inexpensive device which may be used for both purposes.

In the simplest form of the invention shown in Fig. 4 the handle shanks 50 are of ordinary or conventional form with the exception of the auxiliary handle members 51 and 52, and the wooden grip members 15 are connected to the handle shanks in the usual way.

From the foregoing it is believed that the construction, operation and advantages of the invention may be readily understood, and it is apparent that changes may be made in the details disclosed without departing from the spirit of the invention, as expressed in the claims.

Having fully described my invention what I claim as new and desire to secure by Letters-Patent, is:—

A combined hedge clipper and grass cutter, including a pair of pivotally connected crossed handles, each handle comprising a substantially horizontal finger, an upwardly and rearwardly extending intermediate portion, and an upwardly and rearwardly extending shank, the shank being offset relatively to said intermediate portion, cutting blades secured to the fingers, hook-shaped elements fixed to the handles substantially at the points where the intermediate portions merge into the fingers, gripping members surrounding the offset shanks and having their outer surfaces in substantial alignment with the outer surfaces of said intermediate portions, a spring interposed between the shanks for forcing the gripping members away from each other, and means for spacing the gripping members apart and for maintaining them in upwardly diverging relation, whereby the gripping members may be grasped by the hands of the operator for actuating the cutter without liability of pinching the fingers.

In testimony whereof, I have signed this specification.

WILLIAM G. HEIMERDINGER.